United States Patent [19]
Joyce

[11] Patent Number: 5,378,007
[45] Date of Patent: Jan. 3, 1995

[54] TRAILER HITCH UNCOUPLING APPARATUS AND METHOD OF USE

[75] Inventor: Ronald W. Joyce, Mt. Airy, N.C.

[73] Assignee: R. H. J. of Mt. Airy, Inc., Mt. Airy, N.C.

[21] Appl. No.: 151,526

[22] Filed: Nov. 12, 1993

Related U.S. Application Data

[63] Continuation-in-part of Ser. No. 65,181, May 20, 1993, abandoned.

[51] Int. Cl.⁶ ............................................. B62D 53/06
[52] U.S. Cl. .................................... 280/433; 280/441; 280/407
[58] Field of Search ................ 180/209; 280/433, 434, 280/438.1, 441, 149.2, 407, 407.1; 254/17, 22, 113, 119, 120, 129

[56] References Cited

U.S. PATENT DOCUMENTS

| | | | |
|---|---|---|---|
| 3,112,936 | 12/1963 | Cole et al. ............................. | 280/407 |
| 4,251,089 | 2/1981 | Skaggs ................................. | 280/433 |
| 4,738,462 | 4/1988 | Adams ............................. | 280/441 X |
| 4,838,566 | 6/1989 | Baxter et al. ...................... | 280/149.2 |
| 5,190,266 | 3/1993 | Barrera ................................ | 254/17 |
| 5,199,732 | 4/1993 | Lands et al. ................. | 280/149.2 X |

FOREIGN PATENT DOCUMENTS 0064035 10/1945 Denmark.

Primary Examiner—Karin L. Tyson
Assistant Examiner—F. Zeender
Attorney, Agent, or Firm—Olive & Olive

[57] ABSTRACT

The present invention provides an easily stored, compact apparatus useful by a truck driver to release either a trailer hitch latch or a rear wheel carriage latch both of which are often difficult to unlatch. The first component of the apparatus comprises an elongate bar with a hook on one end. A second component comprises a lever which is pivotally and adjustably attached to the bar. When the lever is pressed and pivoted against the side of the trailer and with the hook engaging a respective trailer hitch or rear wheel carriage latch, the apparatus acts to release the latch.

7 Claims, 4 Drawing Sheets

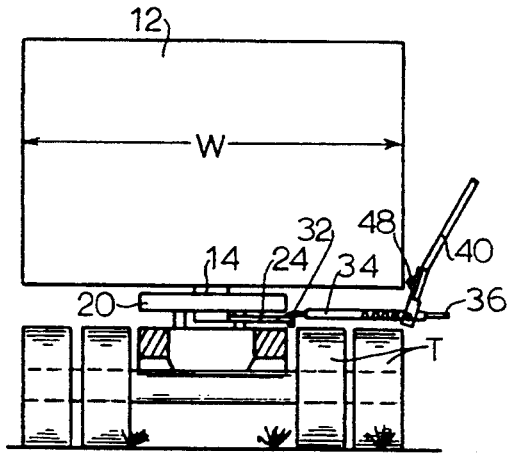
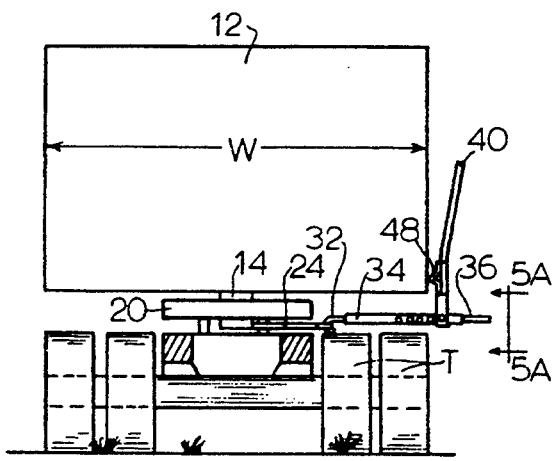
FIG. 4  FIG. 5
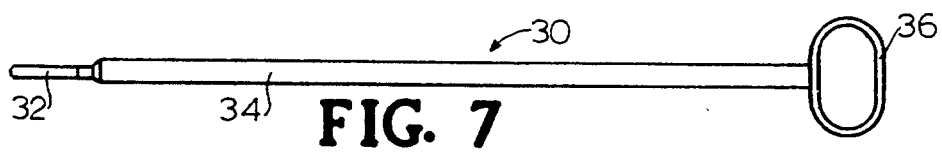
FIG. 7
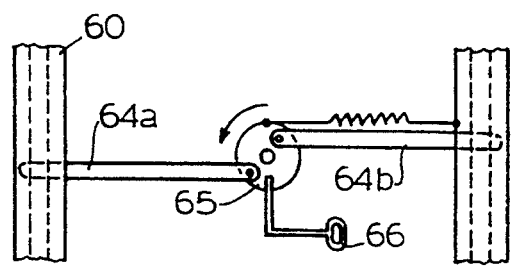
FIG. 9A
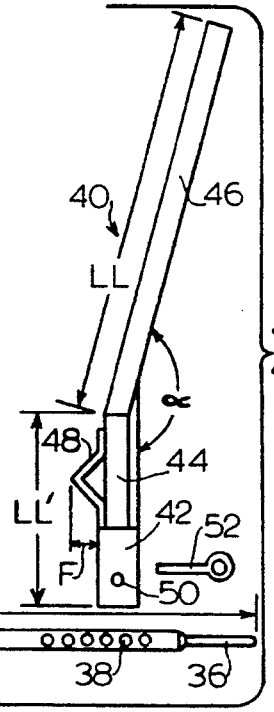
FIG. 6
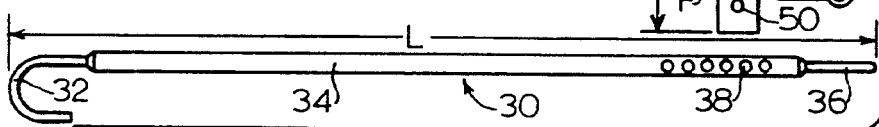
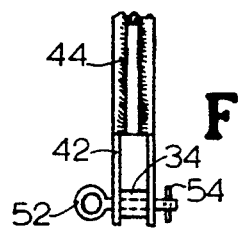
FIG. 5A

TRAILER HITCH UNCOUPLING APPARATUS AND METHOD OF USE

Related Application

This application is a continuation-in-part of co-pending application Ser. No. 08/065,181 filed May 20, 1993 now abandoned.

FIELD OF THE INVENTION

This invention relates to apparatus for applying a pulling force and more particularly to apparatus for pulling a release adapted to uncouple a truck trailer from a tractor.

BACKGROUND OF THE INVENTION

Trucks comprising a separable tractor and trailer typically utilize a substantially round coupling plate in combination with a mating pin. The coupling plate is mounted on the rear portion of the tractor and has a rearwardly open slot adapted to receive and lock the mating pin which is mounted under the forward portion of the trailer. These components are fairly standardized so that effectively any tractor can be coupled to any trailer. This type of hitch device is known in the trade as a "fifth wheel". One known example of a "fifth wheel" device is supplied by Holland Hitch Company of Holland, Mich.

In the coupling operation, the tractor backs to the trailer so that the open slot of the coupling plate engages the pin beneath the trailer and a coupling plate latch automatically snaps closed to lock the pin into engagement. When it is necessary to disengage the trailer from the tractor, a release handle associated with the coupling plate must be pulled to open the latch and enable the trailer and pin to be disengaged. The release handle is permanently attached to the coupling plate which is positioned beneath the trailer and the pin resides midway of the width of the trailer when engaged. A trailer is typically between 96 inches and 102 inches wide outside dimensions and the floor of the trailer resides between 40 inches and 46 inches in height above the ground. This results in a truck driver, in the process of releasing the latch and uncoupling the tractor from the trailer, having to reach beneath a trailer at about 43 inches above the ground inward by a distance as much as 34 inches from the trailer side (recognizing that the release handle extends outwardly about 17 inches from the center of the trailer). In addition, this coupling plate and release handle are located inboard of the tractor's rear wheels, which somewhat obstruct the driver's entry under the trailer during this operation.

When the loaded trailer is coupled to the tractor by means of the fifth wheel hitch device and the trailer's supporting leg is retracted, the weight of the forward end of the trailer rests on the fifth wheel. The amount of the total trailer weight transmitted to the fifth wheel is related not only to the total cargo weight, but also to the distribution of that weight along the length of the trailer. If the trailer weight bearing on the fifth wheel is great, and too much of that weight is carried by the tractor's front wheels, the tractor will be excessively difficult to steer. Conversely, if the weight carried by the front wheels of the tractor is too little and the weight on the tractor's rear wheels is comparatively high, the front end "floats", causing a loss of steering control. Thus, tractors in which the fifth wheel is fixedly positioned on the tractor frame may be difficult to steer under certain Toad conditions. It is for this reason that many truck tractors have fifth wheel apparatus which is mounted on a longitudinal track which permits the operator to position the fifth wheel rearward or forward to accommodate the weight distribution. Fifth wheel adjustability may be over a distance of up to three feet.

When a truck driver is of average height, reaching in that distance to pull the release handle is difficult because it may be farther than the length of his or her arm. When a truck driver is taller, the low height of the trailer is an obstacle to reaching under the trailer. In either instance, the truck driver is likely to dirty his or her clothing in the process of reaching under the trailer. Furthermore, due to exposure to the elements and other factors, the latch and release handle are frequently rusty, dirty and hard to pull, especially in such an awkward position. This combination of conditions does, at least occasionally, result in back or shoulder strain injury, and often dirty clothes.

A related device useful in uncoupling operations for certain tractor-trailer units is disclosed in U.S. Pat. No. 4,251,089 to Skaggs for a Tractor-Trailer Vehicle Decoupling Tool. The device of the Skaggs patent comprises a second class lever, having its point of force application positioned between its handle and its fulcrum. The Skaggs device is useful and is taught with the fulcrum being pressed against the rear wheels of the tractor and the handle extended upwardly. In certain situations, such as, for example a tractor having an adjustably positionable fifth wheel that is adjusted so the release handle of the fifth wheel is not aligned with a tractor rear wheel, the fulcrum of the Skaggs device would have no secure surface against which to bear. Nor could the Skaggs device be used effectively by placing its fulcrum against the side of the trailer and its handle downward, since that orientation would require the operator to crouch in a posture precluding a reasonable application of force, and possibly causing a back injury.

A related problem in the use of tractor-trailer trucks involves the rear wheel carriage. On many contemporary trailers, this rear carriage is positionally adjustable in the forward and rearward direction so as to improve the distribution of the load with respect to the wheels. In order to keep the proportion of the trailer load bearing on the coupling plate in reasonable limits, the rear wheel carnage may be moved forward when the load weight is predominantly toward the trailer nose and moved rearward when the load is toward the tail of the trailer.

Movement of the rear carriage and wheels is accomplished by the rear carriage being slidably mounted on a pair of rails beneath the trailer body. A latching mechanism is provided to engage a series of positioning holes in the rails. The latching mechanism is disengaged by pulling a latch handle so as to release latching pins connected to the latching mechanism. This latch handle is similarly located beneath the trailer body (as in the case of the coupling release handle described above) and one must reach under the trailer in a position which is somewhat awkward. In addition, while the person is holding the latch handle to release the latching mechanism, the trailer must be moved to effect the adjustment of position, thus involving a hazard of injury to the person holding the handle.

In addition to all of the above considerations, trucks typically have small compartments for the storage of tools. Therefore, any apparatus or tool developed for the above mentioned operations must be able to be stored in a small compartment.

It is therefore an objective of this invention to provide an apparatus to assist the truck driver in pulling the release handle to enable the uncoupling of a tractor from a trailer.

It is another objective of this invention to permit the truck operator to pull the hitch release handle and uncouple a trailer from a tractor while standing in an upright posture and thus enable the use of adequate force while minimizing the likelihood of injury.

It is an additional objective of this invention to provide a tractor-trailer uncoupling device which is effective regardless of the position of the fifth wheel with respect to the rear wheels of the tractor.

it is a still further objective of this invention to provide an apparatus to assist the truck driver in pulling a latch handle to allow adjustment of the position of the rear carriage and wheels of the trailer.

It is an additional objective of this invention to provide an apparatus to perform the needed functions which is within the storage size limitations of the tool compartment of a tractor.

Other objects and advantages will be more fully apparent from the following disclosure and appended claims.

SUMMARY OF THE INVENTION

The invention disclosed provides a novel apparatus which is useful for releasing both the coupling latch of a tractor and a trailer and the latching mechanism of the rear wheel carriage unit of the trailer. The apparatus comprises a hook bar having one end formed for engaging and pulling a release handle and an opposite end adapted to be adjustably connected to a lever which serves to amplify the force applied to pull the release handle. The adjustable connection between the lever and the hook bar provides an adjustable pivot point to adapt to various widths of trailer body. The uniquely shaped lever adapts to the purpose and improves the effectiveness of the operation.

The lever is removable from the hook bar whereby the hook bar becomes a pulling handle extension adapted for releasing the latching mechanism of the rear wheel carriage.

The invention uncoupling apparatus easily folds for storage and is sized to fit in the tractor's tool compartment and in use improves both the ease of the releasing operations and the safety of the user.

BRIEF DESCRIPTION OF THE DRAWINGS

FIG. 4 is the view of FIG. 3 with the uncoupling apparatus of the invention in position ready for use.

FIG. 5 is the view of FIG. 4 with the uncoupling apparatus of the invention in position after actuation to pull the coupling latch release handle.

FIG. 5A is an end elevation view taken in the direction of line 5A—5A of FIG. 5 and showing the clevis portion of the lever in engagement with the outer end of the hook bar.

FIG. 6 is an exploded side elevation view of the uncoupling apparatus of the invention.

FIG. 7 is a top plan view of the hook bar portion of the uncoupling apparatus of the invention.

FIG. 9A is a partial top plan view of the rear wheel carriage latch mechanism.

DETAILED DESCRIPTION OF THE INVENTION AND PREFERRED EMBODIMENTS THEREOF

Figure 1:
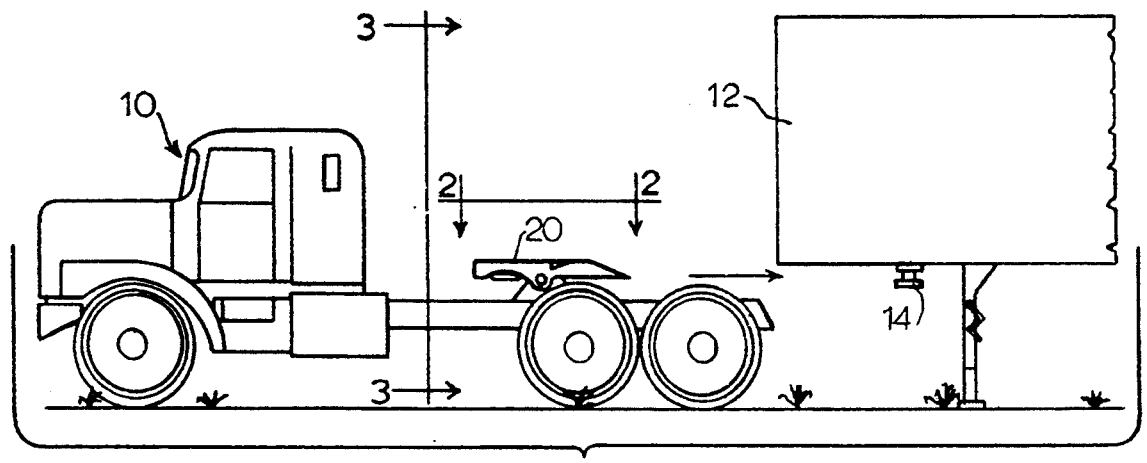
FIG. 1 is a side elevation view of a tractor and a portion of a trailer in the pre-coupled position.

According to the problems described and the objectives outlined above, the invention provides a trailer hitch uncoupling apparatus useful for the standardized plate and mating pin coupling device of tractors and trailers. FIG. 1 illustrates the "fifth wheel" type coupling mechanism common to most contemporary commercial tractor-trailers in a typical position on the tractor. Tractor 10 has a coupling plate 20 which is adapted to engage and support a leading portion of trailer 12. As the coupling plate 20 is brought under the forward portion of trailer 12, pin 14 enters and is latched firmly into the mating slot 26 of coupling plate 20 by means of latch 22. Coupling plate 20 thus serves to both support the weight of the front end of trailer 12 and to pull trailer 12 over the road.

Figure 2:
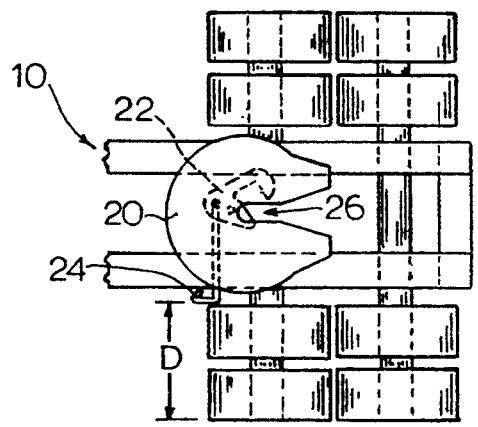
FIG. 2 is a top plan view of the rear portion of the tractor as taken in the direction of line 2—2 of FIG. 1.

A top view of the coupling plate and a portion of tractor 10 is shown in FIG. 2 with schematic detail of the coupling plate 20, including latch 22 and release handle 24. The latch mechanism is configured to automatically close when the pin 14 (FIG. 1) enters the slot 26 and actuates latch 22. To uncouple trailer 12 from tractor 10, release handle 24 is pulled to disengage latch 22. Since the outer end of release handle 24 is located distance D, typically on the order of 34 inches, from the side of trailer 12 and requires reaching past wheels T, release handle 24 is difficult to reach for the average driver.

Figure 3:
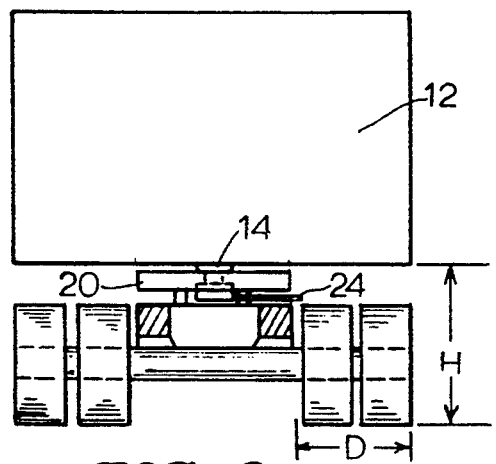
FIG. 3 is a front elevation view taken in the direction of line 3—3 of FIG. 1 wherein the tractor and trailer are coupled.

FIG. 3 shows a front view of a portion of the tractor 10 with coupling plate 20 engaged with and supporting trailer 12. The outer end of release handle 24 is seen as residing a distance D inside the edge of trailer 12 and residing above the ground at height H of approximately 40–44 inches. The space through which one must reach and pull release handle 24 is thus confined, low and long.

The uncoupling tool of the invention, illustrated in detail in FIGS. 6 and 7, is preferably fabricated of aluminum stock and is made up of hook bar 30, lever 40 and a pivot pin 52. Hook bar 30 has a hook 32 at an inner end and a loop shaped handle 36 an outer end of shank 34 of substantially square cross section. Hook 32 is configured to easily engage the release handle 24 located beneath the trailer. Loop handle 36 is useful either to pull the hook bar 30 or to hold it in position as lever 40 is set for operation. Frequently the coupling latch mechanism, as previously stated, will not readily release due to rust, road dirt or ice, and a substantial pulling force is needed.

When attached to lever 40 by means of pivot pin 52, the required pulling force is easily attained. Pivot pin 52, which may be of any convenient form, is engaged through clevis 42 and one of the series of holes 38 to obtain the proper length of hook bar 30 so that the width of the specific trailer is accommodated. Lever 40 has a stem 44 fixedly joined to clevis 42 which pivotably straddles hook bar 30, and an extension 46 which connects at an angle $\alpha$ of approximately 165° to stem 44 in the preferred embodiment, to allow the proper lever movement. A fulcrum 48 is affixed to the side of stem 44 to contact the trailer being uncoupled.

The use of the uncoupling apparatus of the invention is illustrated in FIGS. 4 and 5 in use on a trailer 12 which is assumed to have a typically difficult operating coupling plate latch release handle 24. Hook 32 is engaged with the outer end of latch release handle 24 and hook bar 30 extends over wheels T to the side of trailer 12 where lever 40 is connected at a position so that stem 44 is initially in an approximately vertical orientation and fulcrum 48 bears against a side surface of said tractor-trailer. The side surface according to the preferred embodiment is the lower edge of trailer 12, but could, in other embodiments, be other portions able to bear the applied stress. Extension 46 is thereby directed at an angle to the side of trailer 12 and able to be forced inwardly toward trailer 12, thus applying pulling force to hook bar 30 and latch release handle 24 to cause both to move outwardly from the centerline of trailer 12. The operative length of hook bar 30 is adjusted by attaching lever 40 through the chosen hole 38 (FIG. 6) so as to accommodate width W of trailer 12.

The process of releasing latch handle 24 with the uncoupling apparatus of the invention is shown completed in FIG. 5. Extension 46 has been pressed toward the side of trailer 12, thus forcing the clevis 42 portion away from trailer 12 by pressure on fulcrum 48. The ratio of length above and below fulcrum 48 of about 4:1 achieves a desired mechanical advantage with a tool having a compact overall folded length. Once pin 14 has been released as described, the tractor can be driven out from under the trailer.

The preferred uncoupling apparatus of the invention is made of aluminum which is lightweight, strong, and does not rust. When folded, the apparatus is of a size to be stored in the tool compartment of a typical tractor. In one embodiment, the hook bar length L is 28.5 inches, the length LL of lever extension 44 is 16 inches, the length LL' of lever stem 44 is 7 inches, angle $\alpha$ is about 65° and depth F of fulcrum 48 is 1.5 inches.

Figure 11:
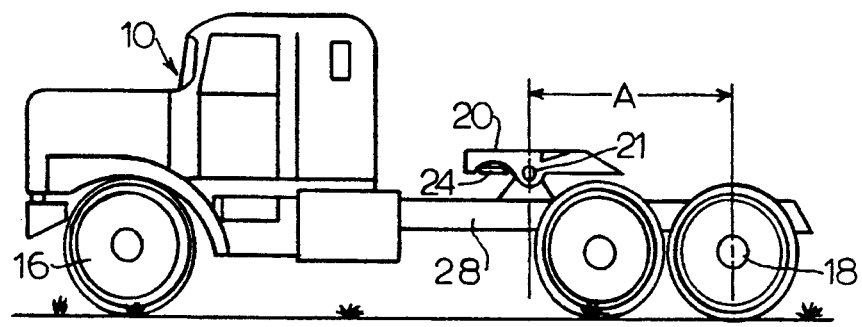
FIG. 11 is a side elevation view of the tractor shown in FIG. 1 with the fifth wheel adjusted to its forward-most position.

As described above, the fifth wheel 20 may be adjusted along a track (not shown) mounted on the tractor frame 28 so as to properly balance the weight pressing on the tractor's front wheels 16 and maintain control of the steering. FIG. 11 illustrates a typical tractor 10 having an adjustable fifth wheel which is adjusted forwardly so that the pivot 21 of fifth wheel 20 is a distance A forward of the rear axle 18 of the tractor. In this adjusted position, the weight of the trailer 12 pressing on the tractor 10 is forward of the two rear wheels and the pressure on the steering wheels 16 is maximized.

Figure 12:
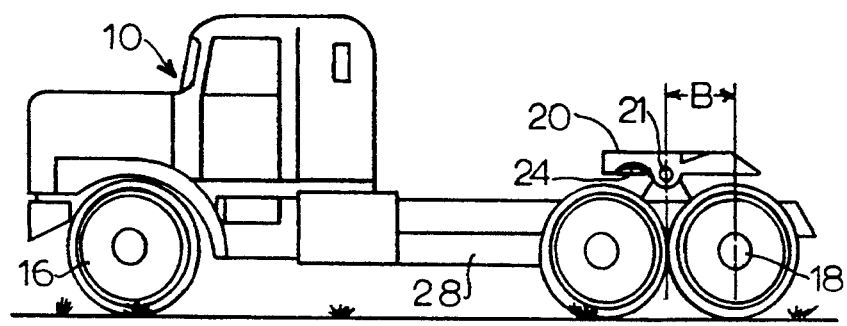
FIG. 12 is a side elevation view of the tractor shown in FIG. 1 with the fifth wheel adjusted to its rearward-most position.

In the illustration of FIG. 12, fifth wheel 20 is adjusted to a maximum rearward position on frame 28 so that fifth wheel pivot 21 is a distance B forward of the rear axle 18 of the tractor. In this adjusted position, the weight of the trailer 12 pressing on the tractor 10 is between the two rear wheels and the pressure on the steering wheels 16 is minimized. The difference between distance A and distance B is typically about three feet.

Figure 13:
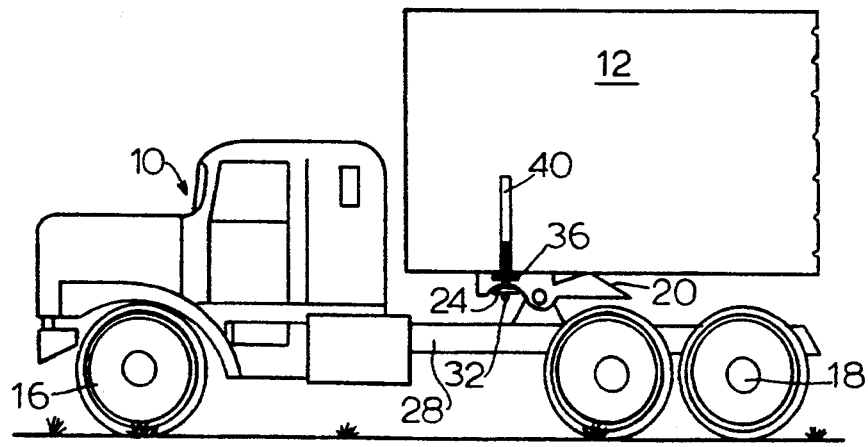
FIG. 13 is a side elevation view of the tractor illustrated in FIG. 11 with a trailer coupled thereto and the hitch uncoupling apparatus of the invention positioned for use.

FIG. 13 shows trailer 12 coupled to tractor 10 by fifth wheel 20. Latch release handle 24 is seen engaged by hook 32 of the uncoupling apparatus of the invention with handle 40 extended upwardly in similar position to that shown in the end elevation of FIG. 4. The advantage of a first class lever being usable regardless of the position of the fifth wheel is here apparent. Application of the tractor-trailer uncoupling apparatus of the invention to a hitching assembly that is fixed in position is equally beneficial.

Figure 8:
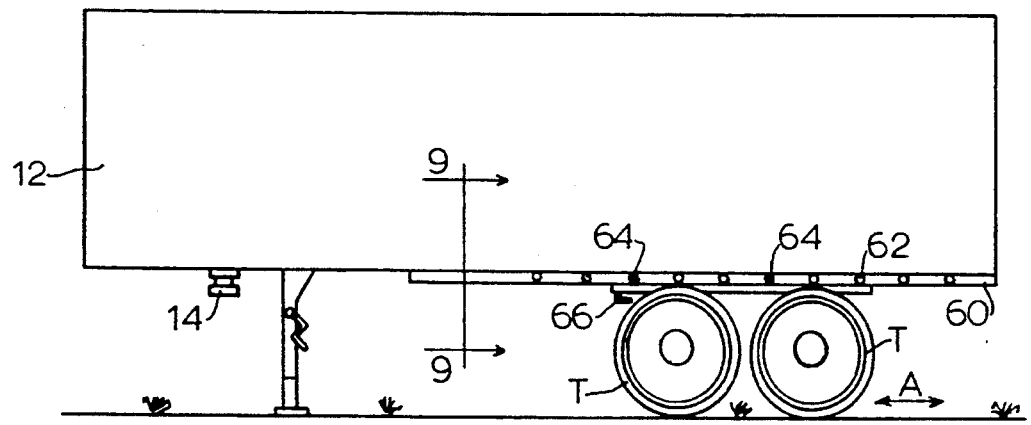
FIG. 8 is a side elevation view of a truck trailer illustrating particularly the positionally adjustable rear wheel carriage thereof.
Figure 9:
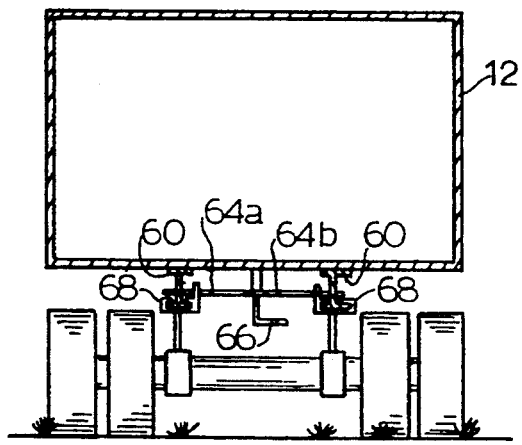
FIG. 9 is a partial elevation view taken in the direction of line 9—9 of FIG. 8 with the rear wheel carriage latched in position.
Figure 10:
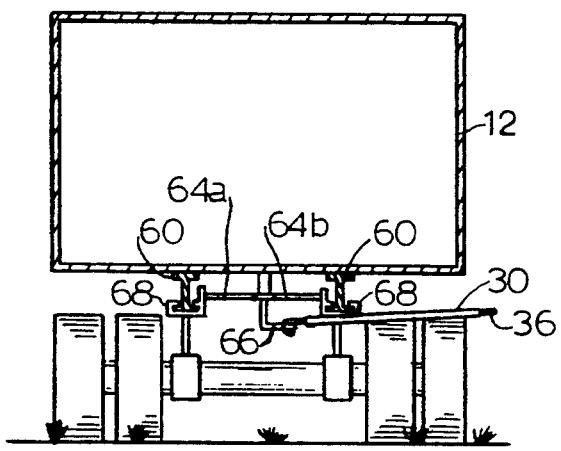
FIG. 10 is the view of FIG. 9 with the hook bar connected and the carriage latch released thereby.

A further use of the trailer hitch uncoupling apparatus of the invention is as a pulling hook for releasing a rear carriage of a trailer 12 as shown in FIGS. 8–10. In the side elevation view of FIG. 8, trailer rails 60 are shown as the support structure of trailer 12 and as having a series of positioning holes 62 along a portion of their length which are adapted to be engaged by the outer ends of a set of conventional locking pins 64. The front elevation view of this adjustment mechanism is seen in locked condition in FIG. 9 and in released condition in FIG. 10. The rear wheel carriage latch mechanism is illustrated in FIG. 9A.

Locking pins 64, comprise left pin 64a and right pin 64b in FIGS. 9, 9A and 10. The inner ends of each locking pin are loosely secured on opposite sides of a rotatable plate 65 which is spring biased to normally force the outer ends of the locking pins 64a, 64b into respective positioning holes 62. The disengagement bar 66 is also attached at its inner end to the rotatable plate 65 and when pulled by the operator against the spring bias disengages the locking pins 64a and 64b which permits trailer 12 to be adjusted on carriage 58. The disengagement bar 66 attached to the plate is held by the truck operator against the spring bias as the rear carriage 58 is adjusted in the direction of arrow A (FIG. 8). As discussed above, if one reaches under trailer 12 as is normally done and pulls disengagement bar 66 manually, the operator's position is awkward, uncomfortable and potentially dangerous, since trailer 12 will move on carriage 58. Therefore, the use of hook bar 30 allows the truck operator to remain in a safe place beside trailer 12 and in an upright position while pulling hook bar 30, thus minimizing the risks. Furthermore, if a rear carriage latch mechanism is difficult to disengage due to rust, dirt or other factors, lever 40 can be employed in concert with hook bar 30 to increase the effective force applied.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A trailer hitch uncoupling apparatus adapted for use by a standing operator for uncoupling a tractor-trailer hitch assembly having an adjustably positionable tractor mounted notched coupling plate for receiving a coupling pin of a trailer by said hitch assembly and having an elongated hitch release handle extending between an inner end connected to a coupling pin latch member and an outer end positioned below and substantially within the width of the trailer, said trailer having opposed side surfaces and said uncoupling apparatus comprising:

(a) an integral elongated horizontally positioned bar member extending between a bar member inner end formed for being releasably connected to the outer end of said release handle and a bar member outer end and adapted to reside at a level below a lower horizontal bottom edge of and proximate a selected side surface of said trailer when said bar member inner end is releasably connected to the outer end of said release handle;

(b) an elongated first class lever having a lower end portion adjacent to and pivotally connected to said bar member outer end, a pivot portion adjacent to and integral with said lower end portion and adapted to bear against said selected side surface of said trailer to serve as a fulcrum for said lever and an upper end portion adjacent to and integral with said pivot portion whereby when said bar member inner end is releasably connected to said release handle outer end, said lever is pivotable about said pivot portion bearing against the selected side surface to pull said release handle and thereby release the coupling pin latch member without requiring operator entry below the trailer;

(c) said bar member having means enabling the location of the connection between said bar member and said lever to be shifted to adjust the length of said bar member between said connection and said bar member inner end; and (d) wherein said pivot portion resides in a position adjacent a straight line between said lower and upper end portions of said lever.

2. The trailer hitch uncoupling apparatus as claimed in claim 1 wherein said bar member inner end is formed with a hook adapted to engage the outer end of said release handle.

3. The trailer hitch uncoupling apparatus as claimed in claim 1 wherein said means for shifting the location of connection between said bar member and said lever comprises a series of transverse, longitudinally spaced holes formed along the outer end of said bar member, said elongated lever lower end portion is formed with a clevis adapted to pivotally straddle said bar member outer end with co-axial apertures formed on opposite sides of said clevis matable with a selected one of said holes and further comprising a locking pin adapted to be inserted through said clevis apertures and said selected one of said holes to provide a selected adjustable position connection between said bar member and said lever.

4. The trailer hitch uncoupling apparatus as claimed in claim 1 wherein said lever lower end and upper end portions are joined in angular relation whereby when said lever is in position to begin to apply a pulling force to said release handle, said lever upper end portion is angled outwardly from said selected side surface of said trailer against which said pivot portion rests.

5. The trailer hitch uncoupling apparatus as claimed in claim 1 wherein said bar member inner end is also adapted to be releasably connected to an outer end of a trailer carriage latch handle so as to be operative to release a trailer carriage for positional adjustment thereof.

6. The trailer hitch uncoupling apparatus as claimed in claim 1 wherein said selected side surface of said trailer comprises a vertical side wall of said trailer.

7. A trailer coupling and uncoupling assembly for a tractor-trailer vehicle in which the tractor is fitted with a frame suited for adjustably mounting such assembly, comprising:

(a) a fifth wheel mounted for lengthwise adjustment on the frame of the tractor, said fifth wheel adapted for coupling the trailer to the tractor;

(b) a release handle on said fifth wheel and extending outwardly therefrom, said release handle adapted to release said fifth wheel to allow uncoupling of the trailer from the tractor; and (c) an uncoupling tool for engaging and applying a pulling force to said release handle while a user of said tool remains standing, said uncoupling tool comprising:

(i) an elongated lever extending between first and second lever ends;

(ii) a handle on said first end of said lever;

(iii) an elongated bar extending between first and second bar ends, said first bar end being pivotably and releasably mounted on said second lever end in a manner adapted to enable adjustment of the location of said mounting;

(iv) hook means formed on said second bar end for engagement of said release handle so that upon movement of said lever said release handle will be pulled for releasing said fifth wheel; and (v) surface engaging means intermediate said first and second ends of said lever forming a fulcrum about which said lever is moveable angularly when said surface engaging means is placed against a side surface of the tractor-trailer vehicle regardless of the position of the fifth wheel on said tractor frame, said surface engaging means being in a position adjacent a straight line between said first and second lever ends.

* * * * *

UNITED STATES PATENT AND TRADEMARK OFFICE
CERTIFICATE OF CORRECTION

PATENT NO. : 5,378,007
DATED : January 3, 1995
INVENTOR(S) : Ronald W. Joyce

It is certified that error appears in the above-indentified patent and that said Letters Patent is hereby corrected as shown below:

Column 2, line 1, correct "Toad" to read --load--. (PTO error)

Column 3, line 19, correct "it" to read --It--. (PTO error)

Column 5, line 60, correct "65°" to read --165°--. (PTO error)

Signed and Sealed this

Seventh Day of March, 1995

Attest:

BRUCE LEHMAN

*Attesting Officer*  *Commissioner of Patents and Trademarks*